United States Patent
Boudot et al.

(10) Patent No.: US 10,625,381 B2
(45) Date of Patent: Apr. 21, 2020

(54) METHOD FOR REPAIRING THE TEETH OF A RING GEAR

(71) Applicant: FIVES FCB, Villeneuve D'ascq (FR)

(72) Inventors: Francois Boudot, Villeneuve D'ascq (FR); David Kotrys, Villeneuve D'ascq (FR); Olivier Vanlerenberghe, Villeneuve D'ascq (FR)

(73) Assignee: FIVES FCB, Villeneuve d'Ascq (FR)

(*) Notice: Subject to any disclaimer, the term of this patent is extended or adjusted under 35 U.S.C. 154(b) by 121 days.

(21) Appl. No.: 15/551,726

(22) PCT Filed: Jun. 11, 2015

(86) PCT No.: PCT/FR2015/051550
§ 371 (c)(1),
(2) Date: Aug. 17, 2017

(87) PCT Pub. No.: WO2016/146900
PCT Pub. Date: Sep. 22, 2016

(65) Prior Publication Data
US 2018/0029174 A1  Feb. 1, 2018

(30) Foreign Application Priority Data
Mar. 17, 2015  (FR) ..................... 15 52197

(51) Int. Cl.
*B23P 6/00* (2006.01)
*B23Q 9/02* (2006.01)
*B23F 17/00* (2006.01)

(52) U.S. Cl.
CPC .................. *B23P 6/00* (2013.01); *B23Q 9/02* (2013.01); *B23F 17/00* (2013.01)

(58) Field of Classification Search
CPC . B23F 17/00; B23F 19/10; B23F 5/00; B23Q 9/0064; B23Q 9/0021; B23P 6/00; B23P 15/14
See application file for complete search history.

(56) References Cited

U.S. PATENT DOCUMENTS

| | | | |
|---|---|---|---|
| 3,129,732 A * | 4/1964 | Moore, Jr. | B23D 59/00 83/754 |
| 3,603,204 A * | 9/1971 | Anderson, Sr. | B23Q 5/385 409/179 |

(Continued)

FOREIGN PATENT DOCUMENTS

| | | | |
|---|---|---|---|
| EP | 1 568 439 A1 | 8/2005 | |
| EP | 1568439 B1 * | 1/2007 | ................ B23P 6/00 |

(Continued)

OTHER PUBLICATIONS

Machine Translation of EP1568439B1 (Year: 2005).*
International Search Report, dated Nov. 5, 2015, from corresponding PCT application.

*Primary Examiner* — Jacob J Cigna
*Assistant Examiner* — Michael W Hotchkiss
(74) *Attorney, Agent, or Firm* — Young & Thompson

(57) ABSTRACT

Method for repairing the teeth of a toothed ring gear, the method using a removable machining device, including a frame and a part moving with respect to the frame, supporting a cutting member, the method including: attaching the machining device to the toothed ring gear by tightening the machining device onto the ring gear in an attachment position on the ring gear with respect to the tooth to be machined; machining the tooth in an automated manner by control of the cutting organ following predetermined machining operations, in which the machining device is moved from an attachment position on the toothed ring gear corresponding to the previously machined tooth, to an (Continued)

attachment position of a neighboring tooth to be machined, while the toothed ring gear is stationary, the machining device being suspended and held by at least one tensioned cable connected to the frame of the rotating machine.

20 Claims, 2 Drawing Sheets

(56) References Cited

U.S. PATENT DOCUMENTS

| | | | | |
|---|---|---|---|---|
| 4,435,902 A * | 3/1984 | Mercer | ............... | B23Q 9/0064 |
| | | | | 299/17 |
| 4,662,804 A * | 5/1987 | Tokita | ............... | B23F 19/105 |
| | | | | 409/8 |
| 5,140,737 A * | 8/1992 | Noland | ............... | B23K 9/04 |
| | | | | 29/402.13 |
| 5,161,291 A * | 11/1992 | Guenther | ............... | B23C 3/00 |
| | | | | 29/56.5 |
| 5,233,744 A | 8/1993 | Noland | | |
| 6,540,455 B1 * | 4/2003 | Speranza | ............... | B23C 3/34 |
| | | | | 409/132 |
| 9,776,298 B2 * | 10/2017 | Clark | ............... | B24B 39/006 |
| 9,802,285 B2 * | 10/2017 | Rieth | ............... | B23Q 9/02 |
| 2004/0234352 A1 * | 11/2004 | Vanderpol | ............... | B23C 3/122 |
| | | | | 409/178 |
| 2011/0087363 A1 * | 4/2011 | Petrescu | ............... | B23Q 9/0021 |
| | | | | 700/174 |

FOREIGN PATENT DOCUMENTS

| | | |
|---|---|---|
| FR | 1 552 195 A | 11/1967 |
| JP | H06 328321 A | 11/1994 |

* cited by examiner

METHOD FOR REPAIRING THE TEETH OF A RING GEAR

The invention relates to a method for repairing the teeth of a ring gear via a machining device.

BACKGROUND OF THE INVENTION

The field of the invention is that of large rotating machines, often having a substantially horizontal axis, such as those found in the chemical, mineral or sugar industries and provided with a large ring gear that allows them to be rotated via a pinion and a motor unit. Examples of rotating machines of this type include rotary furnaces, ball mills, horizontal pebble mills, sugar refinery diffusers . . . .

With these machines, the repeated contact between the teeth of the pinion and of the ring gear is a source of wear, which can manifest itself in various ways given the adjustment of relative position between the drive system that comprises the pinion and the driven machine, and the various movements of the machine other than the rotation about the axis. The shape of the teeth deviates from the original profile that was of the epicyclic type, their thickness decreases, and local surface defects can form.

When the contact surfaces deviate from the ideal profile, the forces exerted on the teeth can take on abnormal directions, and vibrations can occur. This leads to abnormal mechanical stresses on the attachment of the ring gear, on the motor unit, and on the machine itself and its supports that can lead to damage to the various mechanical systems and also amplify the phenomena of wear of the teeth.

When the wear reaches a significant level, the ring gear must be repaired or replaced. The operation of replacement is long and costly for large machines. Given that the rotating machine and the ring gear only rotate in one direction, the contact of the pinion on the ring gear only occurs on one of the two sides of each tooth of the ring gear. Turning the ring gear over, with the goal of exposing the other sides of the teeth that have not undergone wear, is sometimes an alternative. This operation of turning over remains, however, an onerous operation, even if it is a little less costly. In general, it is possible to carry out a repair, in order to restore a shape quality of the contact surfaces that is compatible with good mechanical operation, at least once before having to turn over or replace the ring gear.

Such a repair is carried out without disassembling the ring gear; only the protective parts are removed in order to allow access to the teeth. It consists of machining, generally via grinding, that recreates a shape suitable for meshing on a face of each tooth of the ring gear.

Today, the operations of repairing surfaces of teeth are carried out manually by operators who manipulate the machining or grinding tools. The result of the operation for each tooth is evaluated via comparison to a template that forms the reference shape.

In the experience of the applicant, the final result depends largely on the expertise and the experience of the operator.

SUMMARY OF THE INVENTION

The goal of the present invention is to propose a method for repairing the teeth of a ring gear, suitable for the ring gears of large machines, that does not require the disassembly of the ring gear, and the level of automation of which allows the quality of execution to be reproduced.

The invention has a particular use in machining ring gears having a diameter greater than or equal to 1.5 metres.

Another goal of the present invention is to propose such a method in which the installation of the machining device on the ring gear is carried out simply and quickly.

Other goals and advantages of the invention will appear in the following description that is only given for informational purposes and does not have the goal of limiting it.

The invention relates to a method for repairing the teeth of a ring gear, the method implementing a removable machining device comprising a chassis and a portion mobile with respect to the chassis, supporting a cutting member, said method being implemented on site, without disassembly of the ring gear of the rotating machine that it is intended to rotate, said method comprising the following steps, for carrying out the machining of each tooth:

attaching said device to the ring gear by clamping the machining device onto the ring gear in a position of attachment onto the ring gear corresponding to the tooth to be machined, carrying out the machining of the tooth in an automated manner via the control of the cutting member according to predetermined machining operations, and wherein the machining device is moved from a position of attachment onto the ring gear, corresponding to the tooth previously machined, to a position of attachment of a neighbouring tooth to be machined, at least over a predetermined working range, while the ring gear is immobile, said machining device being suspended and maintained by at least one cable under tension connected to the frame of the rotating machine.

According to one embodiment, the successive movements of the machining device into various attachment positions on the periphery of the ring gear, while the device is suspended and maintained by at least one cable under tension, are carried out while the ring gear is immobile, over a sector of the ring gear within the predetermined working range, on the upper half of the ring gear, defined between an angle of 0° at minimum and an angle of 65° at maximum, the angles being central angles with respect to the horizontal direction.

According to one embodiment of the method:

a partial rotation of the rotating machine is carried out, after machining, by the machining device, of all the teeth of said sector of the ring gear, in order to position the teeth of the neighbouring sector in said predetermined working range, the teeth of said neighbouring sector are machined, one by one, via successive movements of the machining device from a position of attachment onto the ring gear, corresponding to a tooth previously machined, to a position of attachment of a neighbouring tooth to be machined, while the ring gear is immobile, and wherein this sequence is repeated in order to machine the totality of the teeth of the ring gear.

According to one embodiment, the partial rotation of the rotating machine is carried out, while the machining device is attached and rigidly connected to the ring gear, in particular, in an attachment position corresponding to the tooth previously machined.

According to one embodiment, the movement of the machining device maintained and suspended by at least one cable under tension is carried out in the downward direction, in order to position the machining device near the tooth to be machined immediately below. Alternatively, the movement of the machining device maintained and suspended by at least one cable under tension is carried out in the upward direction, in order to position the machining device near the tooth to be machined immediately above.

BRIEF DESCRIPTION OF THE DRAWINGS

According to an advantageous embodiment, the attachment and the locking of the chassis of the machining device onto the ring gear are carried out solely by the action of clamping portions of the machining device onto the sides of the ring gear.

The invention will be better understood upon reading the following description accompanied by the appended drawings among which.

DETAILED DESCRIPTION OF THE PREFERRED EMBODIMENTS

Figure 1:
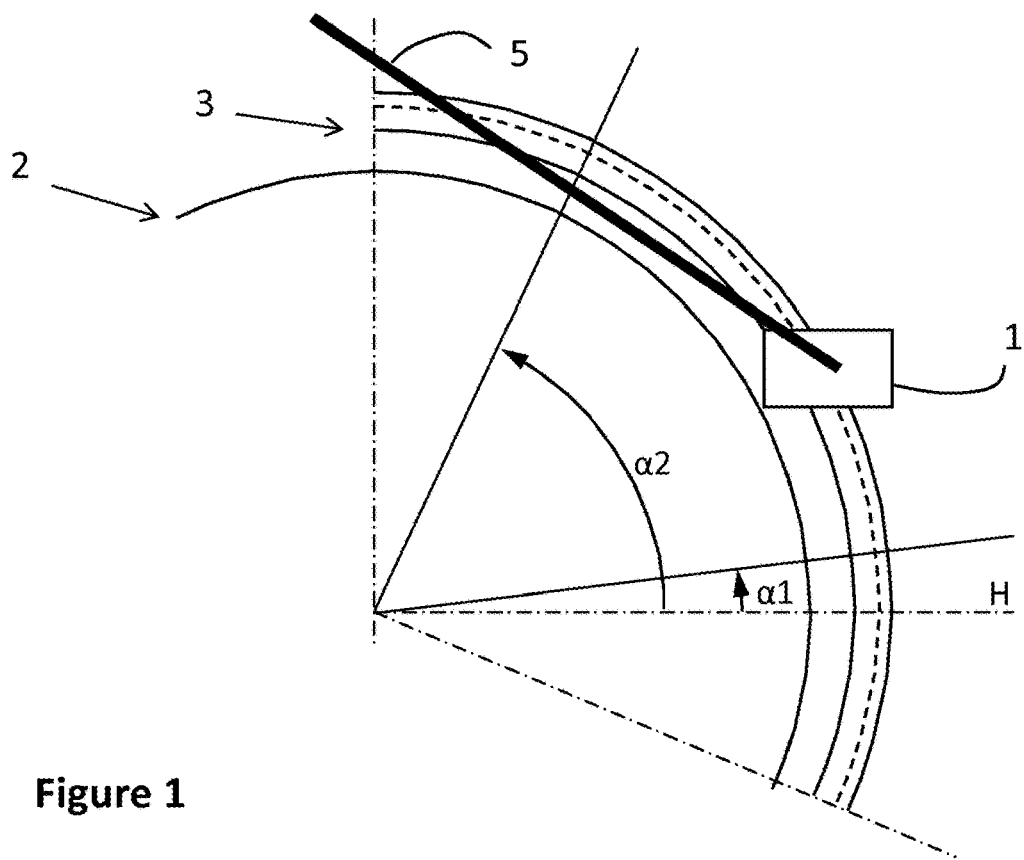
FIG. 1 is a schematic view, along the axis of the rotating machine, illustrating the ring gear, as well as the machining device maintained by at least one cable attached to the frame of the rotating machine.

Thus, the invention relates to a method for repairing the teeth of a ring gear 3, the method implementing a removable machining device 1 comprising a chassis 11 and a portion 13 mobile with respect to the chassis 11, supporting a cutting member 15.

This method is implemented on site, that is to say, advantageously, without disassembly of the ring gear 3 of the rotating machine 2 that it is intended to rotate, typically via a pinion and a motor unit. The rotating machine can be, in a non-limiting way, a rotary furnace, a horizontal pebble mill or a ball mill, or also, in the field of the sugar industry, a machine known as a diffuser. Such rotating machines all have a substantially horizontal axis of rotation.

Said method comprises the following steps, for carrying out the machining of each tooth:

attaching said machining device 1 to the ring gear 3 by clamping the machining device 1 onto the ring gear in a position of attachment onto the ring gear 3 corresponding to the tooth to be machined, carrying out the machining of the tooth in an automated manner via the control of the cutting member 15 according to predetermined machining operations.

The attachment of the machining device 1 to the ring gear can be obtained by clamping the sides of the ring gear, in particular via clamping portions 12 and 12' of the machining device.

Figure 2:
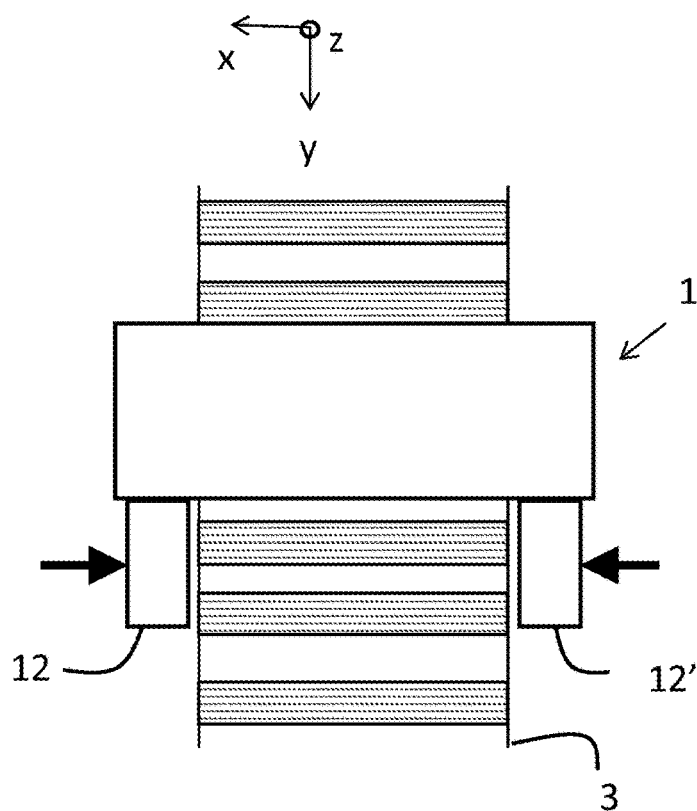
FIG. 2 is a schematic overhead view illustrating the attachment of the machining device onto the ring gear of the rotating machine.

The clamping portions 12 and 12' can be moved on the chassis 11, and can be moved closer together, in a direction perpendicular to the plane of the ring gear 3, in order to obtain the clamping of the two sides of the ring gear 3, via any suitable system such as a nut and bolt system, a hydraulic actuator or other. These clamping portions 12, 12' can also allow, via the bearing created on the sides of the ring gear, the position of the device in a direction perpendicular to the plane of the ring gear, namely the direction according to OX in the reference frames of FIGS. 2 and 3, to be defined.

The position of the machining device 1 with respect to the tooth 4 to be machined can be defined, for example, via bearing on the side of a reference tooth, the side being located, with respect to the tip of the reference tooth, in a direction opposite to the side of the tooth 4 to be machined. The reference tooth can be the tooth to be machined or an immediately preceding tooth.

For this purpose, the device can comprise means 14 for bearing on the side of a reference tooth, located, with respect to the tip of the reference tooth, in a direction opposite to the side of the tooth to be machined, the reference tooth being the tooth 4 to be machined or an immediately preceding tooth.

Figure 3:
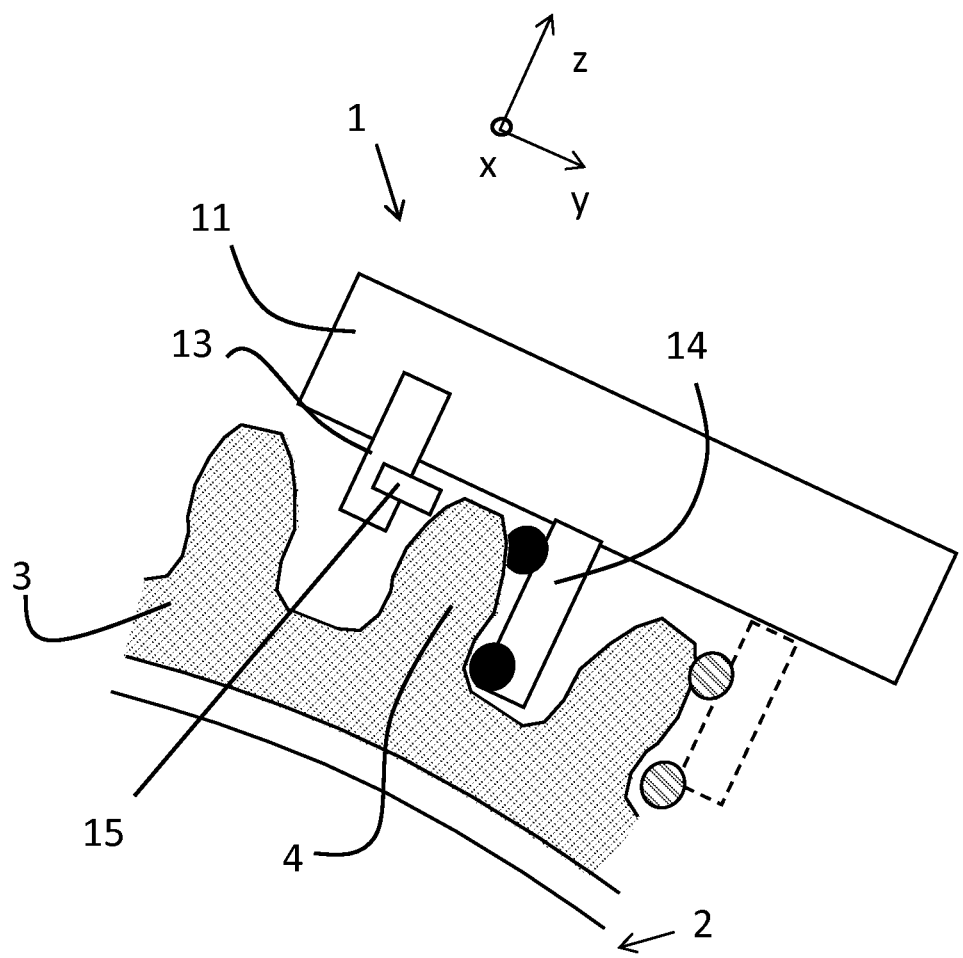
FIG. 3 is a side view illustrating, according to one embodiment of the invention, the positioning of the machining device on the teeth of the ring gear.

As a non-limiting example illustrated in FIG. 3, the means 14 for bearing on the side of the reference tooth comprise a first bearing member and a second bearing member intended to create, respectively, a first lower bearing, and a second upper bearing, having positions offset in terms of height on the side of the tooth. Optionally, the first lower bearing is arranged in such a way as to simultaneously bear on the base of the tooth. The bearing means 14 can allow the position of the machining device in the plane of the ring gear namely the plane OYZ according to FIGS. 2 and 3 to be defined.

According to an advantageous embodiment, the attachment and the locking of the chassis 11 onto the ring gear 3 are carried out solely by the action of clamping the portions 12, 12' onto the sides of the ring gear 3, and the friction between these portions 12, 12' and the sides of the ring gear. In this case, no additional arrangement is necessary to carry out the attachment and locking of the device. Such simplicity of attachment is desired here in that, and to repair all of the teeth of the ring gear, and as will be explained hereinafter, it is necessary to move the device by one tooth many times, into various attachment positions associated with the repair of the various teeth of the ring gear 3, respectively.

The machining of the tooth to be machined is carried out via the control of the cutting member 15 according to predetermined machining operations. For this purpose, the command and control means are suitable for automatically controlling the cutting member 15 in order to carry out the machining of the tooth according to a predetermined profile.

These command and control means can comprise a memory in which operations of machining the tooth according to said predetermined profile are recorded in digital form. These digital machining instructions are created for each ring gear before the beginning of the machining, according to the dimensions of the ring gear, the modulus of the teeth and the state of wear. It allows a perfectly identical profile to be automatically reproduced for each tooth. Once the tooth to be machined has been reshaped, the chassis of the device is unclamped, moved by one step, and again attached to the ring gear with the goal of reshaping the following tooth of the ring gear.

The degrees of freedom of the cutting tool allow the reshaping of the tooth to be machined according to a desired tooth profile, and in particular an epicyclic tooth profile. For this purpose, the mobile portion 13 can be mobile along a plurality of axes, in particular along the axis OX, namely transversely to the ring gear 3, along the axis OY, namely in a direction parallel to the plane of the ring gear and perpendicular to the radial direction passing through the tooth to be machined, and in the direction OZ namely substantially in the radial direction passing through the tooth 4 to be machined. The cutting member 15 can also be able to be oriented with respect to the mobile portion for example along an axis of rotation parallel to the axis OX.

The machining device can be that described in the PCT international application filed the same day by the applicant, as well as in the French patent application FR 1552195 from 17 Mar. 2015: the contents of these applications are included by reference.

According to the invention, the machining device 1 is moved from a position of attachment onto the ring gear 3, corresponding to the tooth previously machined, to a position of attachment of a neighbouring tooth to be machined, while the ring gear 3 is immobile, said machining device 1 being suspended and maintained by at least one cable 5 under tension connected to the frame of the rotating machine 2.

The movement of the device from a position of attachment to a position of attachment of a neighbouring tooth can be assisted by a manual action of the operator. Optionally, and during this action, the length of the cable can be lengthened or shortened via any suitable means, such as a winch or equivalent.

The movement of the machining device 1 maintained and suspended by at least one cable 5 under tension can be carried out in the downward direction, in order to position the device near the tooth to be machined immediately below.

Alternatively, the movement of the machining device 1 maintained and suspended by at least one cable 5 under tension is carried out in the upward direction, in order to position the device near the tooth to be machined immediately above.

According to one embodiment, illustrated schematically for informational purposes in FIG. 1, the successive movements of the machining device 1 into various attachment positions on the radius of the ring gear 3 are carried out while the ring gear 3 is immobile, over a sector of the ring gear 3 within a predetermined working range, on the upper half of the ring gear, and while the device is suspended and maintained by at least one cable 5 under tension.

An example of this working range is illustrated in FIG. 1. According to one embodiment, this working range is defined between an angle $\alpha 1$ of 0° at minimum and an angle $\alpha 2$ of 65° at maximum, the angles $\alpha 1$ and $\alpha 2$ being central angles with respect to the horizontal direction. For example, the working range is the angular range from 0° to 65°.

This working range results from the observations of the inventors according to which, and in order for gravity to act on the machining device in such a way as to allow the cable(s) to place them under tension, and thus retain the machining device, the machining device 1 must move in an angular sector of the ring gear 3 such that all the tangents to the ring gear 3 have a downward slope of at least 25° with respect to the horizontal direction.

When the machining device has carried out the machining of all the teeth of the sector present in the predetermined working range, a partial rotation of the rotating machine 2 can be carried out slowly in order to bring the teeth of the following sector into the angular zone of the working range. The teeth of this sector are then machined in turn, one by one, according to the method previously described.

Thus, and in general, the method can comprise the following steps:

after the machining device has machined all the teeth of said sector of the ring gear 3, a partial rotation of the rotating machine 2 is carried out in order to position the teeth of the neighbouring sector in said predetermined working range, the teeth of said neighbouring sector are machined, one by one, via successive movements of the machining device from a position of attachment onto the ring gear 3, corresponding to a tooth previously machined, to a position of attachment of a neighbouring tooth to be machined, while the ring gear 3 is immobile.

This sequence is repeated as many times as necessary and in order to machine the totality of the teeth of the ring gear 3.

During the partial rotation of the rotating machine 2, the machining device 1 can be advantageously attached and rigidly connected to the ring gear, in particular in an attachment position corresponding to the tooth previously machined.

Naturally, other embodiments could have been envisaged by a person skilled in the art without going beyond the context of the invention as defined by the claims below.

NOMENCLATURE

1. Machining device,
2. Rotating machine,
3. Ring gear,
4. Tooth to be machined
5. Cable
11. Chassis,
12. 12'. Clamping portions,
13. Carriage,
14. Means for bearing on the reference tooth,
15. Cutting member,

The invention claimed is:

1. A method for repairing teeth of a ring gear (3) of a rotating machine (2), the method implementing a removable machining device (1) that has a chassis (11) and a portion (13) mobile with respect to the chassis (11) and supporting a cutting member (15), said method for implementation on site without disassembly of the ring gear (3), said method comprising the following steps for carrying out a machining of each tooth: attaching said machining device (1) to the ring gear (3) by clamping the machining device (1) onto the ring gear in a position of attachment on the ring gear corresponding to a tooth (4) to be machined; machining the tooth to be machined in an automated manner via control of the cutting member (15) according to predetermined machining operations; and moving the machining device (1) from a position of attachment on the ring gear (3) corresponding to a machined tooth to a position of attachment of a neighbouring tooth to be machined while the ring gear (3) is immobile, said machining device (1) being suspended and maintained by at least one cable (5) connected to a frame of the rotating machine (2) and under tension, said at least one cable (5) extending from above said ring gear (3) and carrying a weight of said machining device (1), wherein said at least one cable (5) is alternately lengthened and shortened to hold said machining device (1) in place while said machining device (1) operates upon the tooth to be machined, and wherein the moving of the machining device (1), from the machined tooth to the neighbouring tooth, moves the machining device (1) along an outermost circumferential periphery of the ring gear (3) in either of a downward or upward direction.

2. The method according to claim 1, wherein successive movements of the machining device (1) into various attachment positions along the outermost periphery of the ring gear (3), while the device is suspended and maintained by the at least one cable (5) under tension, are carried out on a sector of the ring gear along an upper portion of the ring gear, within a predetermined working range defined between a first angle ($\alpha 1$) of 0° at minimum and a second angle ($\alpha 2$) of 65° at maximum, the first and second angles ($\alpha 1$, $\alpha 2$) being central angles with respect to the horizontal direction.

3. The method according to claim 2, further comprising:
carrying out, after machining, a partial rotation of the rotating machine (2), by the machining device (1), of all teeth of said sector of the ring gear (3), in order to position teeth of a neighbouring sector in said predetermined working range,
the teeth of said neighbouring sector are machined, one by one, via successive movements of the machining device from a position of attachment on the ring gear (3) corresponding to a tooth of said neighbouring sector previously machined to a position of attachment of a neighbouring tooth of said neighbouring sector to be machined while the ring gear (3) is immobile, and
wherein the successive movements are repeated in order to machine a totality of the teeth of the ring gear.

4. The method according to claim 3, wherein the partial rotation of the rotating machine (2) is carried out while the machining device (1) is attached and rigidly connected to the ring gear.

5. The method according to claim 3, wherein the partial rotation of the rotating machine is carried out while the machining device (1) is attached and rigidly connected to the ring gear (3) in an attachment position corresponding to the machined tooth.

6. The method according to claim 1, wherein movement of the machining device maintained and suspended by the at least one cable under tension is carried out in a downward direction to position the machining device near the tooth to be machined immediately below.

7. The method according to claim 1, wherein movement of the machining device maintained and suspended by the at least one cable under tension is carried out in an upward direction to position the machining device near the tooth to be machined immediately above.

8. The method according to claim 1, wherein attachment and locking of the chassis (11) of the machining device onto the ring gear (3) are carried out solely by the action of clamping portions (12, 12') of the machining device onto the sides of the ring gear (3).

9. The method according to claim 2, wherein movement of the machining device maintained and suspended by the at least one cable under tension is carried out in a downward direction to position the machining device near the tooth to be machined immediately below.

10. The method according to claim 3, wherein movement of the machining device maintained and suspended by the at least one cable under tension is carried out in a downward direction to position the machining device near the tooth to be machined immediately below.

11. The method according to claim 4, wherein movement of the machining device maintained and suspended by the at least one cable under tension is carried out in a downward direction to position the machining device near the tooth to be machined immediately below.

12. The method according to claim 5, wherein movement of the machining device maintained and suspended by the at least one cable under tension is carried out in a downward direction to position the machining device near the tooth to be machined immediately below.

13. The method according to claim 2, wherein movement of the machining device maintained and suspended by the at least one cable under tension is carried out in an upward direction to position the machining device near the tooth to be machined immediately above.

14. The method according to claim 3, wherein movement of the machining device maintained and suspended by the at least one cable under tension is carried out in an upward direction to position the machining device near the tooth to be machined immediately above.

15. The method according to claim 4, wherein movement of the machining device maintained and suspended by the at least one cable under tension is carried out in an upward direction to position the machining device near the tooth to be machined immediately above.

16. The method according to claim 5, wherein movement of the machining device maintained and suspended by the at least one cable under tension is carried out in an upward direction to position the machining device near the tooth to be machined immediately above.

17. The method according to claim 2, wherein attachment and locking of the chassis (11) of the machining device onto the ring gear (3) are carried out solely by the action of clamping portions (12, 12') of the machining device onto the sides of the ring gear (3).

18. The method according to claim 3, wherein attachment and locking of the chassis (11) of the machining device onto the ring gear (3) are carried out solely by the action of clamping portions (12, 12') of the machining device onto the sides of the ring gear (3).

19. The method according to claim 4, wherein attachment and locking of the chassis (11) of the machining device onto the ring gear (3) are carried out solely by the action of clamping portions (12, 12') of the machining device onto the sides of the ring gear (3).

20. The method according to claim 5, wherein attachment and locking of the chassis (11) of the machining device onto the ring gear (3) are carried out solely by the action of clamping portions (12, 12') of the machining device onto the sides of the ring gear (3).

* * * * *